United States Patent Office 3,326,849
Patented June 20, 1967

3,326,849
POLYMERS OF ALKYLENE OXIDES STABILIZED WITH A COMBINATION OF PHENOTHIAZINE AND A UV SCREENING AGENT
George B. Kelly, Jr., and Fred W. Stone, South Charleston, W. Va., assignors to Union Carbide Corporation, a corporation of New York
No Drawing. Filed Oct. 2, 1963, Ser. No. 313,183
5 Claims. (Cl. 260—45.8)

This invention relates, in general, to stabilized polymers of alkylene oxides. In one particular aspect, this invention relates to solid, water-soluble polymers of lower alkylene oxides which have improved stability to ultraviolet light.

In recent years, one of the more outstanding developments of the chemical industry has been the expansion and growth in the preparation of polymers of lower alkylene oxides. Both homopolymers and copolymers of lower alkylene oxides of widely divergent molecular weights, viscosities and solubilities have been prepared and are currently being employed for a variety of purposes. These polymers enjoy wide-spread application and are used to prepare films, sheets, and molded articles having many unique and desirable features.

Notwithstanding the wide spread application of the aforementioned polymers, it has been found that most solid polymers of lower alkylene oxides, and the articles prepared therefrom, are soon degraded by exposure to ultraviolet light. When solid polymers of lower alkylene oxides are processed into films, sheets, and molded articles, these articles upon exposure to ultraviolet light soon become brittle and waxy, and, lose much of their tensile strength. They lose their toughness and inherent flexibility, and are no longer as highly extensible and as impact resistant as they were before exposure to ultraviolet light. In addition, they undergo discoloration which is particularly undesirable in clear, thin films. In general, they lose many of their unique and desirable features which gave rise to their wide-spread application. When the solid polymers of alkylene oxides are processed into films, this sensitivity to ultraviolet light becomes critical. These films upon exposure to ultraviolet light, e.g., sunlight, become brittle and waxy and rapidly lose their tensile strength. On prolonged exposure to ultraviolet light the degradation can proceed so far as to convert the film prepared from the solid polymer of alkylene oxide into a viscous liquid. This effect increases as the film is decreased in thickness, as might be expected. With very thin films, even brief exposures to ultraviolet light, such as sunlight, will produce a marked decrease in the tensile strength of the film.

In order to overcome and prevent the ultraviolet light degradation of solid polymers of lower alkylene oxides, especially solid, water-soluble polymers of lower alkylene oxides, and articles prepared therefrom, e.g., films, sheets and molded articles, and thus maintain the many unique and desirable features possessed by said polymers and articles, a search was undertaken to find ways for stabilizing these polymers and articles against ultraviolet light.

The addition of ultraviolet screening agents to solid polymers of lower alkylene oxides in order to protect them against ultraviolet degradation is known in the art. Ultraviolet screening agents have been added to films prepared from solid polymers of lower alkylene oxides in order to protect the film against degradation by ultraviolet light. But, the ultraviolet screening agents currently employed are relatively expensive when compared with the cost of the polymer itself. Also, appreciable amounts of the ultraviolet screening agents now in use must be employed in order to afford adequate protection for the polymer. This materially increases the cost of both the protected polymer and the protected articles prepared therefrom. The employment of appreciable amounts of ultraviolet screening agents has the further disadvantage of increasing the discoloration of the polymer since many such agents themselves contribute to the discoloration of the polymer.

In accordance with the present invention, it has now been found, quite unexpectedly, that the ultraviolet light stability of solid polymers of lower alkylene oxides, and articles prepared therefrom, e.g., films, sheets, and molded articles, can be considerably increased, enhanced or improved by incorporating in the polymer synergistic amounts of both an ultraviolet screening agent and phenothiazine. This synergistic amount is preferably a small amount. The combination of ultraviolet screening agent and phenothiazine available through this invention results in a stabilization which is different in kind from that heretofore known and helps to overcome the aforementioned disadvantages inherent in the use of appreciable amounts of ultraviolet screening agents.

The increase, enhancement or improvement in the ultraviolet light endurance or stability of the solid polymer of lower alkylene oxide, and the articles prepared therefrom, is advantageously brought about by the combination of small amounts of ultraviolet screening agent and phenothiazine. The stability provided by the combination of this invention is more than the sum of the effects of each component acting alone. In the practice of this invention it was unexpectedly found that the effect of the above combination is materially greater than the sum of the individual effects of each component acting alone. It appears evident that a synergistic effect results from the combination of small amounts of an ultraviolet screening agent and phenothiazine to thereby provide enhanced protection for solid polymers of lower alkylene oxides over that protection provided by the same ultraviolet screening agent and phenothiazine acting alone in said polymers.

Accordingly, one or more of the following objects will be achieved by the practice of this invention. It is an object of this invention to provide solid polymers of lower alkylene oxides, and articles prepared therefrom, which have improved ultraviolet light stability. It is another object to provide solid, water-soluble polymers of lower alkylene oxides, and articles prepared therefrom, which have improved ultraviolet light stability. It is still a further object to provide solid, water-soluble homopolymers of ethylene oxide, and solid, water-soluble articles prepared therefrom, e.g., in the form of water-soluble films, sheets, molded articles, which have improved stability to degradation by ultraviolet light. Another object is to provide ultraviolet light stabilized compositions of matter containing the aforementioned polymers and small amounts of an ultraviolet screening agent and phenothiazine. Another object is to provide solid, water-soluble homopolymers of ethylene oxide, and articles prepared therefrom, stabilized against ultraviolet light degradation having small amounts of an ultraviolet screening agent and phenothiazine incorporated therein. A still further object is to provide a novel process for improving the ultraviolet light stability of films and other articles composed of solid polymers of lower alkylene oxides. These and other objects of the present invention will readily become apparent to those skilled in the art to which this invention pertains from the ensuing description thereof.

In a general aspect, this invention relates to the stabilization of solid polymers of lower alkylene oxides against degradation by ultraviolet light by incorporating in said polymers synergistic, especially small, amounts of an ultraviolet screening agent and phenothiazine. This invention is deemed operable for the stabilization of both homopolymers and copolymers of the aforementioned polymers.

In one particular aspect, this invention is concerned with the stabilization of solid, water-soluble polymers of lower alkylene oxides against degradation by ultraviolet light by incorporating in said polymers small amounts of an ultraviolet screening agent and phenothiazine. In this particular aspect, the solid, water-soluble polymers of lower alkylene oxides comprise both the water-soluble homo- and copolymers of lower alkylene oxides.

The preferred form of this invention involves the stabilization of solid, water-soluble homopolymers and copolymers of lower alkylene oxides, and articles prepared therefrom, e.g., films, sheets, and molded articles, according to the teachings herein. The most preferred form of this invention involves the stabilization of solid, water-soluble ethylene oxide homopolymers, and films, sheets, and molded articles prepared therefrom. Both of these forms are to be disclosed more fully hereinafter.

By the term "lower alkylene oxide," as used herein, is meant a lower alkylene, e.g., ethylene, the double bond of which has been replaced by an oxirane oxygen atom bonded to vicinal or adjacent carbon atoms,

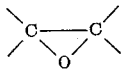

wherein the remaining valences of each carbon atom are satisfied by hydrogen and/or additional carbon atoms whose valences in turn are satisfied by carbon and/or hydrogen atoms, with not more than a total of 10 carbon atoms per lower alkylene oxide molecule.

Lower alkylene oxides which can be polymerized, i.e., homopolymerized or copolymerized, and then stabilized according to this invention are, among others, the monoxides, ethylene oxide, propylene oxide, 1,2-epoxybutane, 2,3-epoxybutane, styrene oxide (phenyl ethylene oxide), and the like. The preferred lower alkylene oxides are those containing one oxirane oxygen atom and from 2 to 4 carbon atoms per molecule, e.g., ethylene oxide, propylene oxide, isobutylene oxide, 1,2-epoxybutane, 2,3-epoxybutane, and the like.

Solid polymers of lower alkylene oxides which can be stabilized according to this invention, include, among others, solid ethylene oxide polymers, propylene oxide polymers 1,2-epoxybutane polymers, 2,3-epoxybutane polymers, phenyl ethylene oxide polymers, and the like, regardless of water solubility.

In the preferred form of this invention, that is, the stabilization of solid, water-soluble polymers of lower alkylene oxides, representative solid, water-soluble polymers of lower alkylene oxides, include, among others, solid, water-soluble homopolymers of ethylene oxide, homopolymers of propylene oxide, homopolymers of 1,2-epoxybutane, homopolymers of 2,3-epoxybutane, and the like, and water-soluble copolymers composed of ethylene oxide in copolymerized form with propylene oxide, 1,2-epoxybutane, 2,3-epoxybutane, phenyl ethylene oxide, and the like, as well as propylene oxide in copolymerized form with 1,2-epoxybutane, and the like. In this form, the invention is meant to also include solid, water-soluble polymers of lower alkylene oxides composed of more than two different lower alkylene oxides such as ethylene oxide in copolymerized form with propylene oxide and phenyl ethylene oxide, and other water-soluble combinations of lower alkylene oxides.

The solid, water-soluble polymers of lower alkylene oxides suitable for use in this invention can be conveniently characterized by the viscosity of their aqueous solutions. In general, any solid, water-soluble lower alkylene oxide polymer having a viscosity of from about 200 centipoises for a 5 percent aqueous solution at room temperature to a viscosity of about 1500 centipoises for a 1 percent aqueous solution at room temperature is satisfactory, but polymers of higher viscosities, up to about 3000 centipoises for a 1 percent aqueous solution, have been used satisfactorily both alone and as components of mixtures with lower viscosity solid, water-soluble lower alkylene oxide polymers. The most preferred solid, water-soluble lower alkylene oxide polymers of this invention are those from about 2,000 to about 65,000 centipoises for a 5 percent aqueous solution at 25° C.

As used herein, unless otherwise indicated, the term "viscosity" refers to "solution viscosity" by which is meant the viscosity of an aqueous solution containing 5 percent by weight of solid, water-soluble lower alkylene oxide polymer at room temperature (25° C.).

The solid, water-soluble lower alkylene oxide polymers of the preferred form of this invention appear to form homogeneous systems in water in all proportions although the relatively higher solution viscosity polymers merely swell on the addition of small amounts of water. On the addition of greater amounts of water, the polymers pass into solution. The water solutions are viscous, the viscosity increasing both with the concentration of the polymer in the solution and with the viscosity of the polymer.

The preparation of the solid, water-soluble lower alkylene oxide polymers which can be stabilized according to this invention, such as solid, water-soluble ethylene oxide homopolymers and copolymers thereof, is the subject matter of U.S. Patents Nos. 2,866,761, 2,971,988, 2,987,489, and others.

A highly preferred form of this invention is the stabilization of solid, water-soluble lower alkylene oxide polymers, both homopolymers and copolymers, composed of lower alkylene oxides of from 2 to 4 carbon atoms. In this form, the copolymers preferred are those containing at least 50 weight percent of ethylene oxide in copolymerized form with up to 50 weight percent of propylene oxide or a butylene oxide. Percentages are based upon weight percent of lower alkylene oxide in the finished polymer.

The most preferred form of this invention is the stabilization of solid, water-soluble ethylene oxide homopolymers and articles prepared therefrom, e.g., films, sheets, and molded articles. In this most preferred form, the solid, water-soluble ethylene oxide homopolymers have a viscosity of from about 200 centipoises for a 5 percent aqueous solution at room temperature to about 1500 centipoises for a 1 percent aqueous solution at room temperature (25° C.). The most preferred polymers have a 5 percent aqueous solution viscosity of from about 2000 centipoises to about 65,000 centipoises at room temperature (25° C.).

The amount or concentration of phenothiazine added to the solid alkylene oxide polymer must be a synergistic amount. Preferably, this synergistic amount is a small amount since one of the advantages of this invention is that only small amounts of phenothiazine are required. In terms of a concentration range, the amount of phenothiazine can range from about .001% to about 2% and more preferably from about .01% to about .1%. The most preferred concentration is about .03%. All concentrations of phenothiazine used herein are based upon amount of phenothiazine present as weight percent of solid alkylene oxide polymer. Concentrations of phenothiazine above and below the aforementioned ranges can also be employed, if they act synergistically. In addition to phenothiazine, phenothiazine derivatives such as the carbocyclic alkyl-substituted derivatives and benzyl derivatives may be suitable for use in this invention.

The amount or concentration of ultraviolet screening agent added to the solid alkylene oxide polymer must be a synergistic amount. Preferably, this synergistic amount is a small amount since one of the advantages of this invention is that only small amounts of ultraviolet screening agent are required. In terms of a concentration range, the amount of ultraviolet screening agent can range from about 0.01% to about 3% and more preferably from about 0.2% to about 1.0%. The most preferred concentration is about 0.5%. All concentrations of ultraviolet screening agent used herein are based upon the amount of ultraviolet screening agent present as weight percent of solid alkylene oxide polymer. Concentrations of ultraviolet screening agent above and below the aforementioned ranges can be employed, if they act synergistically.

Representative classes of ultraviolet screening agents which are suitable for use in the present invention include many of those well-known in the art. Suitable classes include, among others, the benzophenones, the hydroxybenzophenones, the hydroxy-alkoxybenzophenones, the benzotriazoles, the hydroxybenzotriazoles, the hydroxyalkylbenzotriazoles, the resorcinols, the salicylates, the flavones, and others.

Typical commercially available members of the above classes are: 4-tert-butylphenyl salicylate; 5-chloro-2-hydroxybenzophenone; 2,4-dibenzoylresorcinol; 2,4-dihydroxybenzophenone; 2,2'-dihydroxy-4,4'-dimethoxybenzophenone (Cyasorb UV-12); 2,2'-dihydroxy-4,4'-dimethoxybenzophenone in admixture with other tetrasubstituted benzophenones; 2,2'-dihydroxy-4-methoxybenzophenone; 2-hydroxy-4-methoxybenzophenone (Cyasorb UV-9); phenyl salicylate; 3,3'4',5,7-pentahydroxyflavone; 2,2',4,4'-tetrahydroxybenzophenone; 2(2'-hydroxy 5'-methylphenyl) benzotriazole (Tinuvin P); and others.

Particularly suitable ultraviolet screening agents are the substituted and unsubstituted hydroxy-alkoxybenzophenones such as, 2-hydroxy-4-methoxybenzophenone; 2,2'-dihydroxy-4,4' - dimethoxybenzophenone; 2,2' - dihydroxy-4-methoxybenzophenone; 2-hydroxy-4-chloro-6-hydroxybenzophenone; 2,2'-dihydroxy-4 - n - octoxybenzophenone; and the like; and the alkylated hydroxyphenyl benzotriazoles such as 2(2'-hydroxy 5-methylphenyl) benzotriazole.

The most preferred ultraviolet screening agents are: 2-hydroxy-4-methoxybenzophenone, 2,2'-dihydroxy-4,4'-dimethoxybenzophenone; and 2(2'-hydroxy 5'-methylphenyl) benzotriazole, since they give the least color formation, especially important in clear films, combined with excellent ultraviolet protection.

Additional substituted and unsubstituted hydroxyalkoxybenzophenones, which are particularly suitable include, for example, 2-hydroxy-4-ethoxybenzophenone; 2-hydroxy-4-propoxybenzophenone; 2-hydroxy-4-isopropoxybenzophenone; 2-hydroxy-4-tert-butoxybenzophenone; 2-hydroxy-4-pentyloxybenzophenone; 2 - hydroxy-4-hexyloxybenzophenone; 3-hydroxy-5-methoxybenzophenone; 4-hydroxy-6-ethoxybenzophenone; 3,3'-dihydroxy-6,6'-dimethoxybenzophenone; 2-chloro-4-hydroxy-6-methoxybenzophenone; and the like. The hydroxy and alkoxy groups can be in the same or different rings of the benzophenone nucleus, as long as there is at least one hydroxy and one alkoxy group present in the compound. There can be from 1 to 5 hydroxy groups in one ring and from 1 to 5 alkoxy groups in the other ring of the benzophenone nucleus. The alkoxy groups preferred contain from 1 to 6 carbon atoms. The preferred benzophenones contain from 1 to 3 hydroxy groups, all in the same ring, with from 1 to 3 alkoxy groups in the other ring of the benzophenone nucleus.

Additional alkylated-hydroxyphenyl benzotriazoles include: 2(2'-hydroxy 5'-ethylphenyl)benzotriazole; 2(2'-hydroxy 5'-propylphenyl)benzotriazole; 2(2'-hydroxy 5'-isopropylphenyl)benzotriazole; 2(2'-hydroxy 5'-butylphenyl)benzotriazole; 2(2' - hydroxy-5'-tert-butylphenyl)-benzotriazole; 2(2',4'-dihydroxy 6'-methylphenyl)benzotriazole; 1(2'-hydroxy 5'-methylphenyl)benzotriazole; and the like. Those benzotriazoles prefered contain from 1 to 3 hydroxy groups and from 1 to 3 alkyl groups, with the proviso that there be at least one hydroxy and one alkyl group present on the phenyl ring of the alkylated-hydroxyphenyl benzotriazole. The alkyl group is preferably alkyl of from 1 to 6 carbon atoms.

In general, those ultraviolet screening agents suitable are those having an absorptivity within a wave-length range of from about 180 to about 3,900 AU (Angstrom Units), which is near the threshold of visibility.

By the term "small amounts" as employed herein, is meant that concentration or amount of phenothiazine and ultraviolet screening agent which when incorporated in the solid alkylene oxide polymers of this invention substantially improve, enhance or increase the stability or endurance of said polymers and articles prepared therefrom e.g., films, sheets, and molded articles, to ultraviolet light degradation such that the stability or endurance of said polymers to ultraviolet light degradation is increased or enhanced by the combination of phenothiazine and ultraviolet screening agent more than the sum of the individual effects of phenothiazine and ultraviolet screening agent acting alone in said polymers.

As used herein, the term "ultraviolet screening agent" is synonomous with "ultraviolet absorber," and refers to organic compounds which absorb selected portions of the spectrum ranging from the far ultraviolet to the threshold of visible light and which protect the solid alkylene oxide polymers, and articles prepared therefrom, from photochemical degradation. These agents or absorbers may be employed as a component of an outer packaging film made of solid alkylene oxide polymers which will filter out harmful rays or as a constituent of the article itself, depending on the characteristics desired for the ultimate end-use.

The technique by which the phenothiazine and ultraviolet screening agent are incorporated or admixed with the solid alkylene oxide polymer is not critical, and any of a variety of means can be employed to effect intimate admixing of the polymer and additives. Suitable methods involve the admixture of the polymer and additives by such means as a dry blender, Banbury mixer, two-roll mill, and the like. Any mixing process which will result in a relatively uniform distribution of the phenothiazine and ultraviolet screening agent throughout the polymer blend is suitable. Alternatively, the phenothiazine and/or ultraviolet screening agent can be dissolved in a solvent such as benzene or alcohol and applied to the polymer followed by evaporation of the solvent. These techniques and others, are well known in the art and modifications thereof will become apparent in view of the teachings of the present invention. The mixture of polymer and additives can then be converted to films having a thickness of up to about 10 mils, and more preferably from about 1 to about 3 mils, by any suitable technique such as calendering, extruding, and the like. Additionally, the mixture of polymer, phenothiazine and ultraviolet screening agent can be formed into sheets having a thickness greater than 10 mils, or formed into molded articles having a variety of shapes and thicknesses.

It is a known technique to deposit surface layers of ultraviolet screening agents on sheets and molded articles of plastic, as the screening agent is most effective on the surface and of progressively less utility as the screening agent approaches the center of the sheet or article. Thus, a small amount on the surface could impart the same protective quality as a much larger amount distributed throughout the mass of the polymer. This technique is not incompatible with this invention, but in this case the phenothiazine could still be distributed relatively uniformly throughout the mass and the ultraviolet screening agent could be concentrated on the surface by known techniques such as dipping the film, sheet, or article in a solution of the ultraviolet screening agent and evaporating the solvent, or by dusting the surface of the hot film during, or immediately following, the calendering operation, or dusting the surface of the film as it comes from an extruder nozzle. Other methods may be used without departing from the basic idea of the invention.

The most highly preferred stabilized compositions of this invention comprise solid, water-soluble ethylene oxide homopolymers having a 5 percent aqueous solution viscosity of from about 2000 centipoises to about 65,000 centipoises at 25° C., an amount of phenothiazine ranging from about 0.025 weight percent to about 1.0 weight percent, and an amount of ultraviolet screening agent ranging from about 0.2 weight percent to about 1.5 weight percent. All weight percentages are based on the finished polymer.

In clear films it is preferred to use not more than about 0.25 weight percent phenothiazine, since in clear films phenothiazine is discolored by exposure to light, and higher concentrations of phenothiazine produce an objectionable color. In colored or pigmented films a concentration of phenothiazine of up to 2.0 weight percent is not objectional from a color standpoint. In articles of thicker dimensions than most films, such as molded or extruded articles, the discoloration effect of phenothiazine is not nearly so pronounced, and concentrations of up to about 2 percent phenothiazine can be tolerated.

The stabilized films of solid, water-soluble ethylene oxide homopolymer which are prepared according to the teachings herein disclosed readily dissolve in water; moreover, the novel films are essentially not effected in storage or in transit under ordinary conditions of humidity. Unit packages and containers prepared from the novel films of this invention can be employed as containers for materials such as hydrocarbon oils, detergents, dry bleaches, insecticides, fungicides, motor oil, or other materials which are unpleasant or dangerous to handle and that are normally made up in water. These products can be stored for extended periods of time without noticeable deterioration of the container. In addition, these packages can be sealed, after insertion of the desired material therein, by such means as, for example, heat sealing, electronic sealing, conventional adhesives, or other techniques well-known in the art. Unit packages and containers produced from the novel films of this invention can take the form of boxes, tubes, packets, and the like. It is to be understood that these novel films are not limited to use in unit packaging but can be employed in general use where the characteristics possessed by these films are desired.

The following examples and table are illustrative of the invention.

*Example I*

A 100-gram sample of solid, water-soluble ethylene oxide homopolymer having a viscosity of about 20,000 centipoises as a 5 percent aqueous solution, was weighed out in a 1-pint container. Then 0.50 gram of 2-hydroxy-4-methoxybenzophenone, as ultraviolet screening agent, and 0.05 gram of phenothiazine were added to the weighed sample of polymer in the 1-pint container. The lid was placed tightly on the container and the additives were mixed with the polymer by vigorous shaking for about 1 minute. The mixture was then placed on a 2-roll mill which had been preheated with 50 lb. steam, and 15 grams of a nonylphenol polyethylene glycol ether (20 mols of ethylene oxide) was added as a stress-crack relief agent and the whole was blended for 3 minutes by standard cutting and folding techniques with a 10-mil roll spacing. The roll spacing was then reduced to about 5 mils and the film was pulled from the rolls and placed on a smooth metal sheet to cool. The film was smooth, flexible, tough, and had only a slight greenish-yellow color due to the presence of the ultraviolet screening agent. A strip of this film was exposed 4 inches below two 40-watt fluorescent sun lamps emitting ultraviolet light. The strip was examined at 8-hour intervals to determine its resistance to degradation from the ultraviolet light of the sun lamps. This strip containing the phenothiazine in addition to 2-hydroxy-4-methoxybenzophenone did not become brittle until 456 hours had elapsed.

*Example II*

A 100-gram sample of solid, water-soluble ethylene oxide homopolymer having a viscosity of about 20,000 centipoises as a 5 percent aqueous solution, was weighed out in a 1-pint container. Then 0.50 gram of 2-hydroxy-4-methoxybenzophenone, as ultraviolet screening agent, was added to the weighed sample of polymer in the container. The lid was placed tightly on the container and the polymer and ultraviolet screening agent were mixed by vigorous shaking for about 1 minute. The mixture was then placed on a two-roll mill which had been preheated with 50 lb. steam, and 15 grams of nonylphenol polyethylene glycol ether (20 mols of ethylene oxide) was added as a stress-crack relief agent and the whole was blended for 3 minutes by standard cutting and folding techniques with a 10-mil roll spacing. The roll spacing was then reduced to about 5 mils and the film was pulled from the rolls and placed on a smooth metal sheet to cool. The film was smooth, flexible, and tough, and had only a slight greenish-yellow color due to the presence of the ultraviolet screening agent. A strip of this film was exposed 4-inches below two 40-watt fluorescent sun lamps emitting ultraviolet light. The strip was examined at 8-hour intervals to determine its resistance to degradation from the sun lamps. This strip containing only 2-hydroxy-4-methoxybenzophenone and no phenothiazine became brittle in 240 hours.

*Example III*

A 100-gram sample of solid, water-soluble ethylene oxide homopolymer having a viscosity of about 20,000 centipoises as a 5 percent aqueous solution, was weighed out in a 1-pint container. Then 0.05 weight percent of phenothiazine was added to the weighed sample of polymer in the container. The lid was placed tightly on the container and polymer and phenothiazine were mixed by vigorous shaking for about 1 minute. The mixture was then placed on a two-roll mill which had been preheated with 50 lb. steam, and 15 grams of a nonylphenol polyethylene glycol ether (20 mols of ethylene oxide) was added as a stress-crack relief agent and the whole was blended for 3 minutes by standard cutting and folding techniques with a 10-mil roll spacing. The roll spacing was then reduced to about 5 mils and the film was pulled from the roll and placed on a smooth metal sheet to cool. The film was smooth, flexible, and tough. A strip of this film was exposed 4 inches below two 40-watt fluorescent sun lamps emitting ultraviolet light. The strip was examined at 8-hour intervals to determine its resistance to degradation from the ultraviolet light of the sun lamps. This strip containing only phenothiazine and no ultraviolet screening agent became brittle in 48 hours.

It may be seen from Example I that the combination of an ultraviolet screening agent and phenothiazine gave 216 more hours of ultraviolet light stability over the identical concentration of the same ultraviolet screening agent acting alone in Example II, and 408 more hours of protection over the identical concentration of phenothiazine acting alone in Example III. These examples illustrate the advantage of the combination of this invention.

The following table compares the ultraviolet light stability of films containing both an ultraviolet screening agent and phenothiazine, with that of films containing only the ultraviolet screening agent or only phenothiazine.

TABLE.—STABILITY OF SOLID, WATER-SOLUBLE ETHYLENE OXIDE HOMOPOLYMER TO ULTRAVIOLET LIGHT EFFECT OF ULTRAVIOLET SCREENING AGENTS AND PHENOTHIAZINE IN 10-MIL FILMS

| Example | Ultraviolet Screening Agent | | Phenothiazine Amount Present, as Weight Percent of Homopolymer | Ultraviolet Light Endurance, Hours [1] |
|---|---|---|---|---|
| | Name | Amount Present, as Weight Percent of Homopolymer | | |
| 4 | None | 0 | 0 | 24 |
| 5 | do | 0 | 0.03 | 40 |
| 6 | do | 0 | 0.10 | 80 |
| 7 | 2(2'-hydroxy 5'-methylphenyl) benzotriazole. | 1.0 | 0 | 186 |
| 8 | 2-hydroxy-4-methoxy-benzophenone | 0.2 | 0 | 144 |
| 9 | do | 0.5 | 0 | 240 |
| 10 | 2,2'-dihydroxy-4,4'-dimethoxybenzophenone. | 0.5 | 0 | 144 |
| 11 | do | 0.5 | 9.10 | 264 |
| 12 | 2-hydroxy-4-methoxy-benzophenone | 0.05 | 0.03 | 120 |
| 13 | do | 0.5 | 0.03 | 264 |
| 14 | do | 1.0 | 0.03 | 406 |
| 15 | do | 0.2 | 0.05 | 406 |
| 16 | do | 0.5 | 0.05 | 456 |
| 17 | do | 1.0 | 0.05 | 569 |
| 18 | 2(2'-hydroxy 5'-methylphenyl) benzotriazole. | 0.2 | 0.03 | 115 |
| 19 | do | 0.5 | 0.03 | 184 |
| 20 | do | 1.0 | 0.03 | 216 |

[1] Time before becoming brittle when exposed to two 40-watt fluorescent lamps at a distance of 4 inches. Brittleness was measured by bending the strip with the fingers. Brittle trips broke or crumbled on bending 90°. Before exposure to trips could be folded doubles without breaking. A different portion of the strip was bent for each trial to avoid error from fatigue at any one point.

It is evident from the foregoing examples, and by comparison of the data in the above Table, that the effect of the combination of phenothiazine and ultraviolet screening agent is materially greater than the sum of the individual effects of each acting alone.

Although the invention has been illustrated by the preceding examples, the invention is not to be construed as limited to the materials therein, but rather, the invention encompasses the generic area as hereinbefore disclosed. Various modifications and embodiments of this invention can be made without departing from the spirit and scope thereof.

What is claimed is:

1. An alkylene oxide polymer composition stabilized against ultraviolet light degradation consisting essentially of (1) a solid polymer selected from the group consisting of homopolymers of a lower alkylene oxide and interpolymers of at least two different lower alkylene oxides, (2) an ultraviolet screening agent selected from the group consisting of the hydroxy-alkoxybenzophenones and the alkylated hydroxyphenyl benzotriazoles in an amount of about 0.01 percent to about 3 percent based on the weight of said solid polymer and (3) phenothiazine in an amount of about 0.001 percent to about 2 percent based on the weight of said solid polmer.

2. A polymeric composition as described in claim 1 wherein the amount of ultraviolet screening agent is from about 0.2 percent to about 1 percent and the amount of phenothiazine is from about 0.01 percent to about 0.1 percent.

3. A polymeric composition as described in claim 2 wherein the solid polymer is ethylene oxide homopolymer and the ultravoilet screening agent is 2-hydroxy-4-methoxy-benzophenone.

4. A polymeric composition as described in claim 2 wherein the solid polymer is ethylene oxide homopolymer and the ultraviolet screening agent is 2,2'-dihydroxy-4,4'-dimethoxy-benzophenone.

5. A polymeric composition as described in claim 2 wherein the solid polymer is ethylene oxide homopolymer and the ultraviolet screening agent is 2(2'-hydroxy 5'-methylphenyl)-benzotriazole.

References Cited

UNITED STATES PATENTS 2,687,378  8/1954  Goldschmidt et al. 260—611.5 X
2,786,080  3/1957  Patton _____ 260—611.5
3,219,621  11/1965  Prichard _____ 260—45.95
3,256,211  6/1966  Bailey et al. _____ 260—45.8 X

OTHER REFERENCES

Strobel et al.: Ind. Engr. Chem. Prod. Res. & Dev., December 1962.
McGary: J. Poly. Sci 46 (147), pp. 51–57, 1960.

DONALD E. CZAJA, *Primary Examiner.*

LEON J. BERCOVITZ, M. J. WELSH,

*Assistant Examiners.*